United States Patent [19]

Yamamoto

[11] Patent Number: 5,119,381
[45] Date of Patent: Jun. 2, 1992

[54] PROGRAM EXECUTION MALFUNCTION DETECTING METHOD FOR AN AUTOMOBILE CONTROLLING DEVICE

[75] Inventor: Yorihisa Yamamoto, Shiki, Japan

[73] Assignee: Honda Giken Kogyo Kabushiki Kaisha, Tokyo, Japan

[21] Appl. No.: 530,434

[22] Filed: May 31, 1990

Related U.S. Application Data

[63] Continuation of Ser. No. 153,284, Feb. 5, 1988, abandoned.

[30] Foreign Application Priority Data

Feb. 5, 1987 [JP] Japan .................................. 62-26037

[51] Int. Cl.⁵ .............................................. G05B 23/02
[52] U.S. Cl. .................................. 371/62; 364/431.11
[58] Field of Search ...................... 364/431.04, 431.05, 364/431.07, 431.11, 186; 371/16.3, 62, 19

[56] References Cited

U.S. PATENT DOCUMENTS 4,310,889  1/1982  Imai et al. ...................... 364/431.04
4,410,938  10/1983  Higashiyama ...................... 364/200
4,527,248  7/1985  Takase et al. ...................... 364/565

Primary Examiner—Stephen M. Baker
Attorney, Agent, or Firm—Pollock, Vande Sande & Priddy

[57] ABSTRACT

A method for detecting malfunctioning of a digital computer of a control device which repetitively processes a main routine and, at each predetermined timing, interrupts the processing of the main routine in order to process at least one interruption routine. The method includes the steps of (a) changing the contents of a first stored data after a predetermined plurality of consecutive interrupt routines are executed, (b) setting a second stored data equal to the first stored data in processing the main routine, (c) outputting the second stored data as a signal from the digital operating circuit in processing the interruption routine, and (d) identifying a malfunction by detecting whether the contents of the second stored data outputted from the circuit remain constant for a time longer than a second predetermined time.

7 Claims, 3 Drawing Sheets

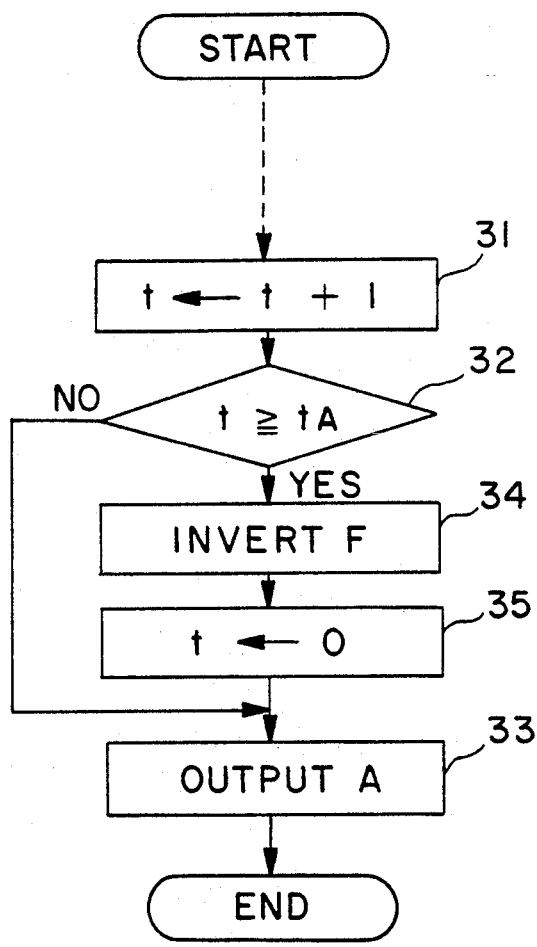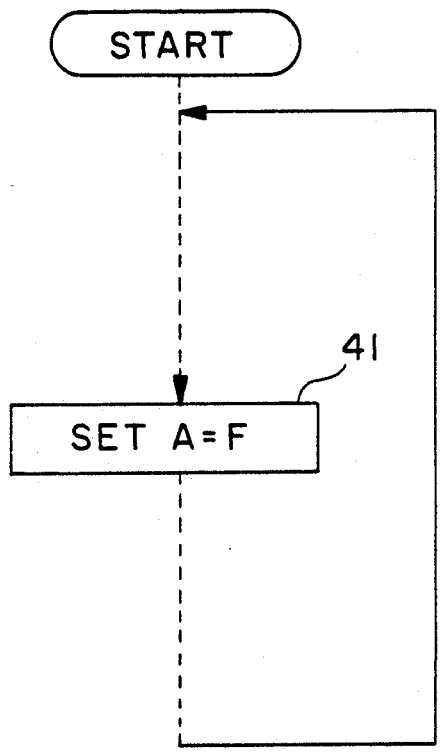

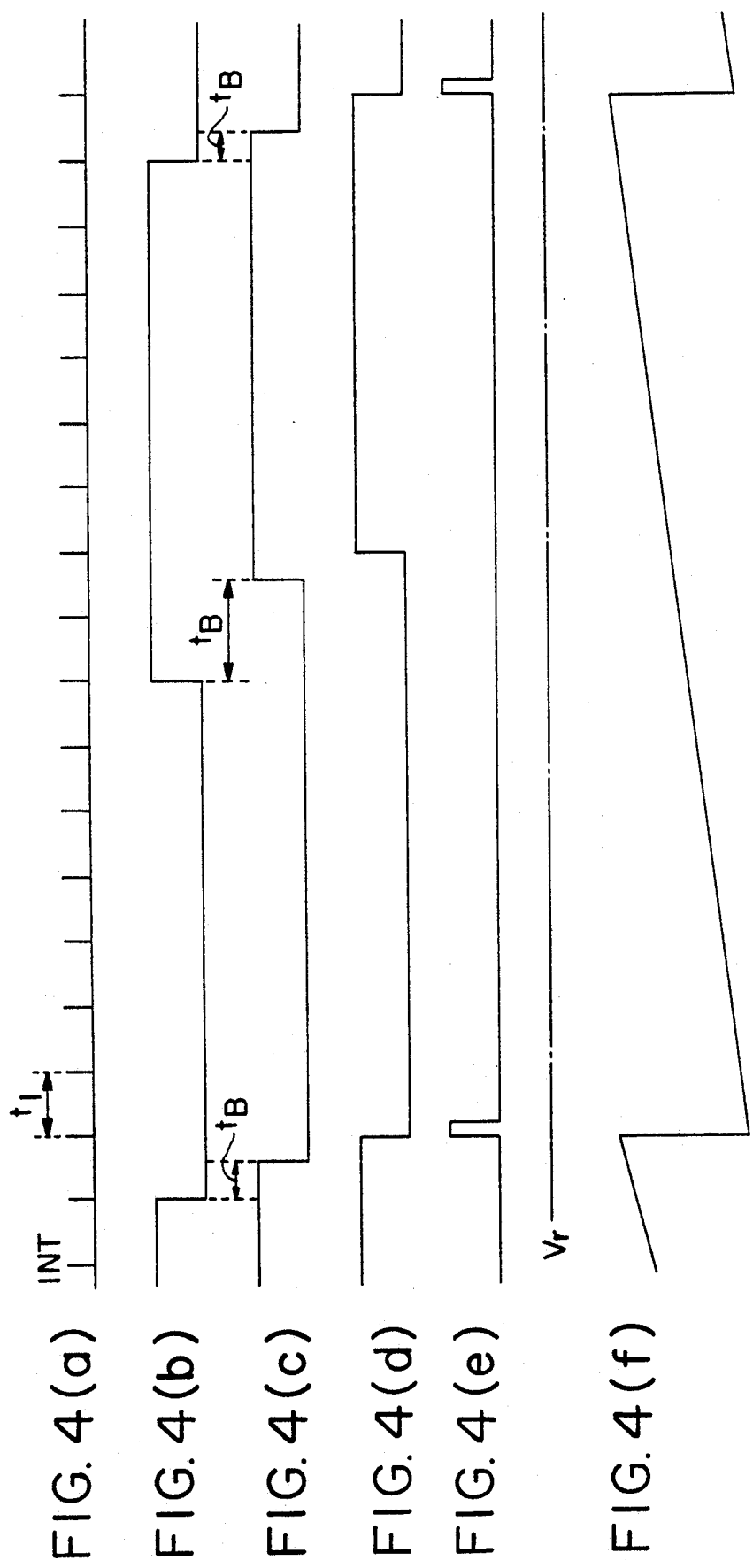

PROGRAM EXECUTION MALFUNCTION DETECTING METHOD FOR AN AUTOMOBILE CONTROLLING DEVICE

This application is a continuation of application Ser. No. 07/153,284 filed Feb. 5, 1988, abandoned.

This invention relates to a method for detecting malfunctioning of a digital computer of a control device such as an electronic fuel injection control device or an ignition timing control device for an internal combustion engine, and particularly for a control device having a digital operating circuit therein.

BACKGROUND OF THE INVENTION

Fuel injection control devices are known wherein an amount of fuel to be injected is calculated from various operating parameters of an internal combustion engine, and fuel injection valves are operated in accordance with results of such calculations. Some of these devices utilize a microcomputer wherein a predetermined routine stored in advance in a memory such as a ROM is processed repetitively either at a predetermined cycle or in a synchronized relationship with rotation of the engine by a microcomputer, in order to calculate an amount of fuel to be injected on a continuing basis.

Such a microcomputer sometimes malfunctions from ignition noise or the like of an internal combustion engine. For example, a microcomputer may execute a program bypassing some steps or may repetitively process steps within a loop of a routine without escaping from within the loop. A control device which eliminates such malfunctions is disclosed in Japanese Patent Publication No. 60-42341. wherein a microcomputer develops a reset signal each time a main routine is processed and, in case no reset signal has been developed for a time longer than a predetermined time because processing of the microcomputer has not returned from an interruption routine to the main routine, the microcomputer is initialized.

However, in such a digital computer for a control device, although a malfunction in an interruption routine can be detected, a malfunction in a main routine sometimes escapes detection.

SUMMARY OF THE INVENTION

Accordingly, it is an object of the present invention to provide a malfunction detecting method for a control device which can detect a malfunction in both a main routine and an interruption routine.

A malfunction detecting method for a control device of the present invention is characterized in that contents of a first stored data are changed after each time lapse of a first predetermined time is monitored in processing an interruption routine. A second stored data is set equal to the first stored data in processing of a main routine, and subsequently the second stored data is outputted as a signal from a digital operating circuit in the processing of the interruption routine. A malfunction is determined when it is detected that the contents of the second stored data outputted from the digital operating circuit has remained unchanged for a time longer than a second predetermined time.

BRIEF DESCRIPTION OF THE DRAWINGS

In order that the invention may be more clearly understood, reference will now be made to the accompanying drawings, in which an embodiment of the invention is shown for purposes of illustration, and in which

FIG. 2 is a flow chart showing an interruption routine;

FIG. 3 is a flow chart showing a main routine; and

FIGS 4(a) -4(f) are a waveform chart illustrating operations of various components of the device of FIG. 1.

DETAILED DESCRIPTION

Figure 1:
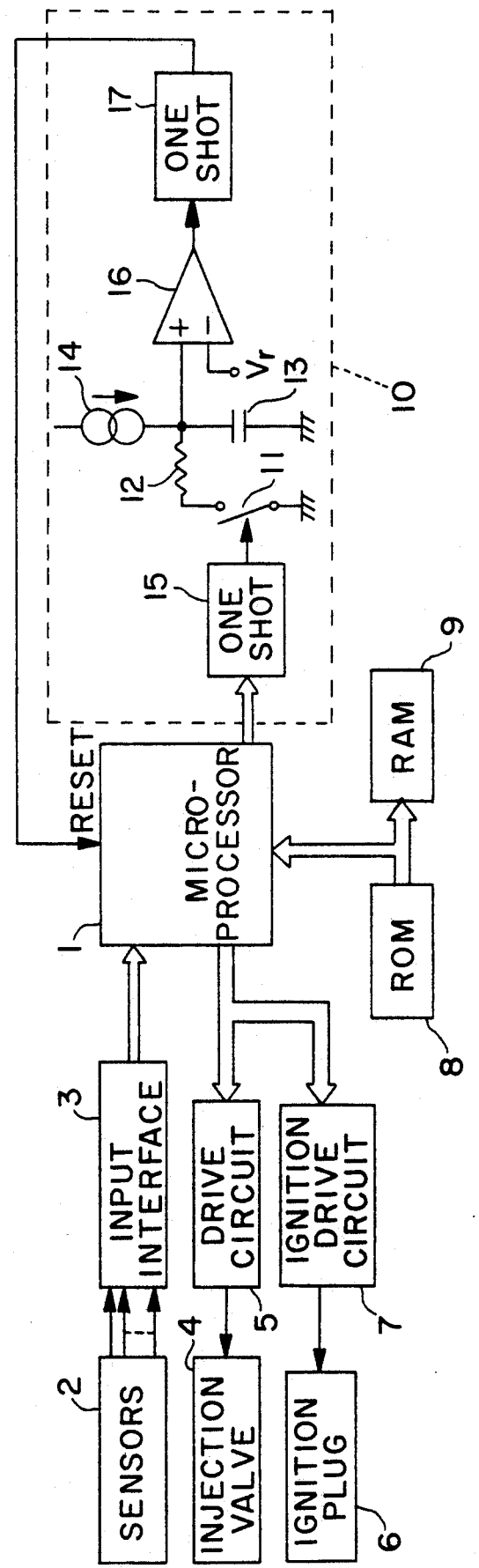
FIG. 1 is a block diagram showing construction of a control device for an internal combustion engine to which the malfunction detecting method of the present invention is applied.

FIG. 1 shows a control device for an internal combustion engine to which the malfunction detecting method of the present invention is applied. In the present device, various sensors 2 which detect operation parameters of the engine (not shown), such as a temperature of cooling water, an angle of a crank or an absolute pressure in a suction pipe are, connected to a microprocessor 1 by way of an input interface 3 composed of analog-to-digital converters, and so on. A fuel injection valve 4 is connected to the microprocessor 1 by way of a driving circuit 5. The fuel injection valve 4 is located near a suction valve of the engine. Also, an ignition driving circuit 7 is connected to the microprocessor 1 in order to cause spark discharging of an ignition plug 6. As memories for the microprocessor 1, a ROM 8 in which programs of a main routine, sub-routines and interruption routines as well as such various data as data tables and so on are stored in advance, and a RAM 9 in which data during operation are stored, are connected to a common bus. A malfunction detecting circuit 10 is also connected to the microprocessor 1.

In the malfunction detecting circuit 10, a switching element 11, a resistor 12, a capacitor 13 and a constant-current regulated power source 14 form a charging/discharging circuit. A series circuit of the switching circuit 11 and the resistor 12 is connected in parallel to the capacitor 13, and a one-shot multivibrator 15 is connected to a control terminal of the switching element 11. The one-shot multivibrator 15 develops a pulse signal of a predetermined width as an on driving signal for the switching element 11 in response to an output signal of the microprocessor 1. The capacitor 13 is gradually charged by a constant-current flow supplied from the constant-current regulated power source 14, and quickly discharges the accumulated charge in response to switching on of the switching element 11. The terminal voltage of the capacitor 13 is supplied to a comparator 16 on which it is compared with a reference voltage $V_r$. Output of the comparator 16 is connected to another one-shot multivibrator 17, and a pulse developed from the one-shot multivibrator 17 is supplied as a reset signal to a reset terminal of the microprocessor 1.

It is to be noted that, while the input interface 3, driving circuits 5 and 7, ROM 8 and RAM 9, and one-shot multivibrator 15 are connected to the microprocessor 1 by way of different buses, otherwise a microprocessor of the type wherein such circuits are connected to a single common bus may be employed. Further, though not shown, a clock pulse generator is connected to the microprocessor 1.

With such a construction, the microprocessor 1 starts its processing of the main routine in response to switching on of an ignition switch (not shown) and develops an internal interruption signal after each lapse of a predetermined time $t_1$ (for example, 1 msec) in order to interrupt the processing of the main routine and execute processing of an interruption routine. Thus, outputs of the sensors 2 are read into the microprocessor 1 and an injection data representative of an amount of fuel to be injected is calculated, and then, when the crank angle reaches a predetermined angle, the injection data thus calculated is outputted to the driving circuit 5 to drive the fuel injection valve 4. Also, an ignition data representative of an ignition angle is calculated, and when the crank angle becomes equal to the ignition data, an ignition instruction is delivered to the driving circuit 7 to cause spark discharging at the ignition plug 6.

A malfunction detecting method of the present invention will now be described. The microprocessor 1 executes, in the interruption routine, an interruption processing program as shown in FIG. 2, and increments a count value t by one (step 31) and then monitors whether or not the count value t reaches a predetermined value $t_A$ (step 32). Here, if $t<t_A$, then a data A serving as a second stored data is outputted to the one-shot multivibrator 15 (step 33), whereafter processing of the microprocessor 1 returns to the main routine. To the contrary, if $t \geq t_A$, then a value of a flag F serving as a first stored data is inverted (step 34). I.e., the content of the flag F is monitored, and if the flag F is equal to 1, then it is changed to F=0, while, if the flag F is equal to 0, then it is changed to F=1. After such inversion of the value of the flag F, the count value t is cleared to zero for initialization (step 35), and then a data A is outputted to the one-shot multivibrator 15 (step 33), whereafter processing of the microcomputer 1 returns to the main routine. It is to be noted that steps 31 to 35 are positioned at a portion of the interruption processing program which is always processed when the interruption routine is processed correctly.

In the main routine, the microprocessor 1 executes a main processing program and sets the data A equal to the value of the flag F (step 41), as shown in FIG. 3. It is to be noted that step 41 is positioned at a portion of the main processing program which is always processed when the main routine is processed correctly.

The flag F and the data A are initialized and thus made equal to "0" at a point of time when the ignition switch is turned on.

Now, if it is assumed that $t_A=8$ where normal operation continues, then an interruption signal INT is developed after each lapse of the time $t_1$, as shown in FIG. 4(a), and the flag F is inverted from "0" to "1" or "1" to "0" after each lapse of time $8 \times t_1$, as shown in FIG. 4(b). In the main routine after such inversion of the flag F, the data A is set equal to the value of the flag F after some processing delay time $t_B$, as shown in FIG. 4(c), and in the processing of the interruption routine entered in response to development of an interruption signal INT directly hereafter, the data A is outputted as high and low level signals, as shown in FIG. 4(d), to the one-shot multivibrator 15. The one-shot multivibrator 15 delivers a pulse signal of a predetermined width, as shown in FIG. 4(e), in response to a falling edge of the input signal from the high level to the low level. The pulse signal causes switching on of the switching element 11. Consequently, the charge accumulated in the capacitor 13 is discharged to the ground via the resistor 12 and switching element 11 so that the terminal voltage of the capacitor 13 is lowered rapidly to the ground voltage. After the pulse signal disappears, a constant-current from the constant-current regulated power source 14 flows through the capacitor 13 so that the terminal voltage of the capacitor 13 gradually increases at a constant rate, as shown in FIG. 4(f). During normal operation, at a point of time when the switching element 11 is switched on, the terminal voltage of the capacitor 13 is lower than and never reaches the reference voltage $V_r$. Accordingly, the output of the comparator 16 remains at the low level, and no reset signal is developed from the one-shot multivibrator 17.

Meanwhile, in case a malfunction of a program step occurs in processing of the interruption routine, the operation to invert the value of the flag F at step 34 or the operation of outputting of the data A at step 33 may not be effected. If the value of the flag F is not inverted, then the value of the data A to be outputted from the microprocessor 1 will not be inverted even if the data A is set equal to the value of the flag F in the main routine. Meanwhile, in case a malfunction of a program step-away occurs in processing of the main routine, even if the operation to invert the value of the flag F is effected correctly in processing of the interruption routine, the value of the flag F may not be delivered to the data A. Accordingly, if the value of the data A is not made equal to the flag F in processing of the main routine, the value of the data A to be outputted from the microprocessor 1 will not be inverted in processing of the interruption routine. If the value of the data A to be outputted from the microprocessor 1 is not inverted or the data A is not outputted in this manner, the one-shot multivibrator 15 will not develop a pulse signal. Consequently, the terminal voltage of the capacitor 13 will exceed the reference voltage $V_r$.

Accordingly, the output of the comparator 16 will be changed over from the low level to the high level. In response to such changing over, a reset signal is delivered from the one-shot multivibrator 17 to the microprocessor 1 to place the microprocessor 1 into an initialized state.

It is to be noted that while, in the embodiment of the present invention described above, the second predetermined time is defined as a time until the terminal voltage of the capacitor 13 reaches the reference voltage $V_r$ after the data A outputted from the microprocessor 1 has been inverted from "1" to "0", monitoring of continuation for a time longer than the second predetermined time of a state in which the data A remains not inverted may otherwise depend upon a count value of a counter which counts the clock pulses to the microprocessor 1.

Further, while in the embodiment of the present invention described above the interruption routine is processed after each lapse of the predetermined time $t_1$, the present invention can be applied also to a case wherein an interruption routine is processed each time the crank angle reaches a predetermined angle.

Further, where there are a plurality of interruption routines one of which is selectively processed at each predetermined timing, it may be recommended that a step for inverting a value of the flag F at each lapse of time $8 \times t_1$ be included in each of the interruption routines so that the value of the flag F may be inverted in processing of the selected interruption routine.

In addition, while in the embodiment of the present invention described above the first and second stored data are each a data of such a minimum unit as "0" or "1", they may be different data of a plurality of bits representing a character or the like.

As described hereinabove, in the malfunction detecting method of the present invention, contents of a first stored data are changed each time a first predetermined time has elapsed in processing of an interruption routine, then the first stored data is delivered to a second stored data in processing of a main routine, and then the second stored data is outputted as a signal from a digital operating circuit in the processing of the interruption routine.

Accordingly, a malfunction due to program executions not only in the interruption routine but also in the main routine can be detected, depending upon a change in contents of the second stored data outputted from the digital operating circuit. Therefore, when a malfunction due to program execution occurs in either the main routine or the interruption routine, such a malfunction can be controlled to a minimum extent by immediately initializing the digital operating circuit in response to a detection of such a malfunction.

Thus, there is described in accordance with one embodiment a method for detecting a program execution malfunction and reset of the computer executing the program. Those skilled in the art will recognize yet other embodiments defined by the claims which follow.

What is claimed is:

1. A method of detecting a program execution malfunction in a digital computer system which generates operating parameters for an automobile engine in response to an automobile crank angle signal, comprising:
   (a) periodically initiating an interrupt signal;
   (b) executing an interrupt routine contained in said digital computer system each time an interrupt signal is initiated;
   (c) changing a first stored data only after a predetermined plurality of interrupt routines are executed;
   (d) during execution of each interrupt routine, generating output data corresponding to a second stored data;
   (e) executing a main program routine following execution of each interrupt routine, and setting said second stored data equal to said first stored data; and,
   (f) detecting whether said output data changes within a predetermined amount of time, whereby a program execution error is detected.

2. The method of detecting a program execution error in accordance with claim 1, further comprising generating a reset signal for said digital computer each time said program execution error occurs.

3. The method of detecting a program execution error of claim 2, wherein said first stored data is changed on every eighth execution of said interrupt routine.

4. The method of claim 2 wherein said method of generating a reset signal comprises:
   (a) resetting a timing circuit each time said output data changes state; and,
   (b) generating a time out signal if said timing circuit is not reset within a predetermined time interval.

5. In an automobile computer operated control system, which executes a main operating routine, and an interrupt routine each time an interrupt signal is produced, a method for initiating a reset of said computer to initiate a start of said main program comprising:
   (a) changing a first stored data value only after a predetermined plurality of consecutive interrupt routines are executed;
   (b) generating an output data signal corresponding to second stored data each time an interrupt routine is executed;
   (c) executing said main program after execution of said interrupt routine;
   (d) during execution of said main program, replacing said second stored data with said first stored data, whereby said output data signal will periodically change; and,
   (e) initiating reset of said computer to execute said main program when said output data does not change in a predetermined time interval.

6. The method of claim 5, wherein said first stored data is changed by inverting said first stored data.

7. The method of claim 5, wherein said predetermined plurality of consecutive interrupt routines is equal to eight.

* * * * *